W. B. McLAUGHLIN.
APPARATUS FOR PRODUCING FORMALDEHYDE.
APPLICATION FILED FEB. 7, 1908.
932,635.
Patented Aug. 31, 1909.
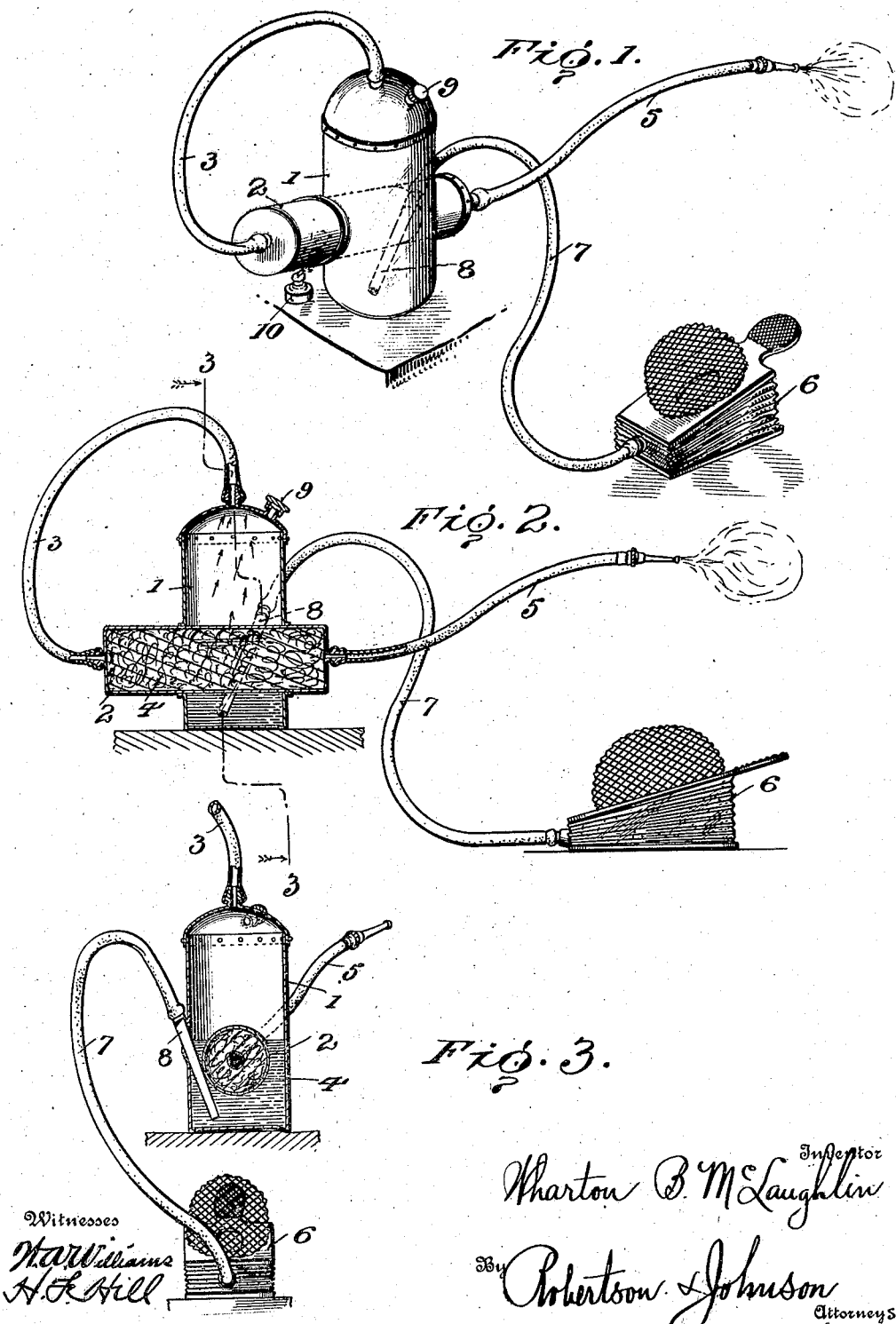

UNITED STATES PATENT OFFICE.

WHARTON B. McLAUGHLIN, OF NEW YORK, N. Y., ASSIGNOR TO THE SANITATION AND SUPPLY COMPANY, OF NEW YORK, N. Y., A CORPORATION OF NEW YORK.

APPARATUS FOR PRODUCING FORMALDEHYDE.

932,635.  Specification of Letters Patent.  Patented Aug. 31, 1909.

Application filed February 7, 1908. Serial No. 414,824.

*To all whom it may concern:*

Be it known that I, WHARTON B. McLAUGHLIN, of the city of New York, in the State of New York and county of New York, have invented certain new and useful Improvements in Apparatus for Producing Formaldehyde, of which the following is a specification.

My invention relates to apparatus for producing formaldehyde, and is particularly useful for the purpose of disinfection. To this end, the apparatus may conveniently be constructed of such proportions as to be readily portable.

Before proceeding with the description of my apparatus I may say that it is designed to utilize the principle that formaldehyde may be generated by bringing a mixture of the vapor of methyl alcohol and air into contact with a catalytic agent heated to a dull red.

My invention in its preferred form therefore consists in the apparatus illustrated, described and claimed herein.

Referring to the drawings: Figure 1 is a perspective view. Fig. 2 is a central sectional elevation. Fig. 3 is a sectional elevation on the line 3—3, Fig. 2.

1 is a closed container for alcohol.

2 is an oxidizing chamber extending through the container 1 and projecting outwardly therefrom considerably further on one side than on the other, the ratio of the lengths of these projections being suitably four to one, although I do not limit myself thereto. Indeed it is not essential to have the chamber project beyond the container at the delivery end. The container 1 is connected with the oxidizing chamber 2 by a pipe 3, to which fuller reference will shortly be made. The oxidizing chamber 2 is of suitable material capable of enduring a considerable heat, preferably thin steel which is especially suited for this use since it has the right degree of conductivity of heat. Other metals, however, or even other materials not metallic, such as porcelain and glass, might be used. This oxidizing chamber 2 contains refractory material 4 treated with a catalytic agent. I employ preferably copperized or platinized asbestos, which is advantageous since it is a poor conductor of heat and therefore does not hinder the raising of the temperature of the chamber to the point of oxidation. Copperized asbestos, *i. e.* asbestos impregnated with copper oxid is regarded as superior to platinized asbestos, *i. e.* asbestos impregnated with platinum oxid, since the latter has a tendency to produce over oxidation and the generate formic acid.

5 is a delivery pipe connected with the chamber 2 and is of any suitable length.

6 is a means for passing air through the apparatus and is shown as a bellows for forcing air therethrough. This bellows is connected by a pipe 7 with a pipe 8 extending downwardly into the container from a point which may be about half way up the container to a point near the bottom thereof under the chamber 2. It will be understood that the apparatus is air tight.

As the means for passing air through the apparatus I have shown a bellows which obviously will deliver the air in pulsations and thus make the air pressure in the apparatus varying or intermittent causing an intermittent glowing and dying of the incandescence and causing the action to take place in a most efficient manner preventing too high pressure and consequent decomposition of the formaldehyde and formation of $CO_2$. As will be apparent from the claims, however, I am not confined to such intermittent action or to means for forcing air under varying or intermittent pressure into the container and through the apparatus, but may obviously pass it through in any other suitable way.

It will be noted that the chamber 2 has its long extension at the end which the connecting pipe 3 enters. This extension is for the purpose of enabling the oxidizing chamber to be heated externally by any suitable means as the lamp 10 to a low red so as to start the oxidizing reaction whereby the alcoholic vapor is changed into formaldehyde. Sufficient heat is evolved in this reaction to make it unnecessary to heat the chamber 2 externally except initially.

In producing formaldehyde, great difficulty is experienced in preventing flashing back—that is in preventing the vapor and air from being ignited and leaping back into the container 1, which would prevent the production of formaldehyde and would be likely to blow up the apparatus. One of the chief advantages of my process and apparatus is that all danger of flashing back is prevented. To this end, the pipe 3 connecting the container 1 with the oxidizing chamber 2 is in whole or in part of relatively small cross sectional area with respect to the cross sectional area of the chamber 2. As shown in the drawings, I have made this pipe of uniform cross section throughout, but I do not wish to be limited to this precise arrangement. The cross sectional area of the opening into the chamber 2 should, however, be relatively small. In practice I have used a pipe an eighth of an inch in internal diameter with a chamber an inch to an inch and a half in internal diameter. With a chamber of this size or of a diameter not exceeding two inches, I use an eighth inch to a quarter inch pipe.

The manner of using the apparatus is as follows: The filling plug 9 of the container being removed, sufficient methyl alcohol is introduced into the container 1 to cover at least in part the oxidizing chamber 2. The plug is then replaced. Heat is applied to the longer extension of the oxidizing chamber 2, and air is forced into the bottom of the container 1 by the bellows 6 by means of the flexible pipe 7 and the pipe 8, and passing up through the alcohol in the container forms a mixture of air and vapor of alcohol which passes by the pipe 3 to the oxidizing chamber 2 where, as soon as the catalytic agent has been heated to the proper degree, the oxidizing reaction begins and formaldehyde is produced and delivered through the flexible pipe 5. As previously stated so much heat is evolved in the reaction which produces the formaldehyde as to heat the material within the oxidizing chamber and the walls of the said chamber to a high degree, and this chamber being in direct contact with the alcohol acts to vaporize it.

The operation of my apparatus in preventing flashing back is, according to my understanding of what occurs, as follows: The mixture of air and alcoholic vapor being at a higher temperature than that of the surrounding atmosphere undergoes a certain amount of condensation in passing through the pipe 3 and tends, therefore, to keep the asbestos adjacent to the point where this pipe opens into the oxidizing chamber moist. When it is remembered that the copperized or platinized asbestos acts as a catalytic agent to convert methyl alcohol into formaldehyde only when it is at a low red heat, it can readily be understood that the moist portion of the asbestos would be inert and would thus prevent the red hot material in the oxidizing chamber 2 from causing the vapor to flash back into the container 1.

While the above explanation is satisfactory and while I believe it to be correct, I wish it to be clearly understood that my apparatus does unquestionably as a matter of fact prevent flashing back whatever the correct theory of operation may be.

What I claim as my invention is:—

1. In apparatus of the character described, in combination, a container, a chamber extending within the same, means external to the container for connecting the container with the chamber, and means for delivering air into the container below said chamber.

2. In apparatus of the character described, in combination, a container for alcohol, a catalytic agent within the container but out of direct contact therewith, means for forcing air through the alcohol and means for bringing the mixture of alcoholic vapor and air into contact with the catalytic agent to oxidize the alcoholic vapor and vaporize the alcohol.

3. In apparatus of the character described, in combination, a container for alcohol, a chamber arranged for contact with the alcohol in the container, and containing refractory material treated with a catalytic agent, means for connecting the container with the chamber, and means for passing air around the chamber and through the apparatus.

4. In apparatus of the character described, in combination, a container for alcohol, an oxidizing chamber extending within said container provided with an air inlet and with an outlet but otherwise closed, means to connect said container with said inlet, refractory material within the container treated with a catalytic agent, and means for passing air into the container and through the apparatus.

5. In apparatus of the character described, in combination, an upright container, a chamber extending across the same near its bottom, means for connecting the container with the chamber, a pipe extending downwardly and obliquely into said container and having its end adjacent the chamber, and means for forcing air through said pipe into and through the apparatus.

6. In apparatus of the character described, in combination, a container, a chamber extending therethrough and projecting further on one side than on the other, a catalytic agent in said chamber, means for connecting the container with the longer projection of the chamber, a delivery pipe in communication with the other projection, and means to pass air through the apparatus.

7. In apparatus of the character described, in combination, a container for alcohol, a chamber of thin steel extending within the container, means for connecting the container and chamber, and means for delivering air into the alcohol adjacent the chamber and for passing it through the apparatus.

8. In apparatus of the character described, in combination, a container for alcohol, an oxidizing chamber extending within the container, a pipe connecting said container and chamber and having a part at least of a small cross sectional area relative to that of the chamber, and means for passing air through the apparatus.

9. In apparatus of the character described, in combination, a container for alcohol, a chamber extending within the container, means for connecting said container and chamber having an opening into the latter of relatively small cross sectional area with respect to that of the chamber, and means for passing air through the apparatus.

10. In apparatus of the character described, in combination, a container for alcohol, a pipe, a chamber containing a catalytic agent and extending within the container, said elements being connected in series in the order named, and means for passing air through the series.

11. In apparatus of the character described, in combination, a container for alcohol, a chamber containing a catalytic agent, means for introducing air into the alcohol adjacent said chamber, and means for connecting the upper part of the container with the chamber said chamber being closed to the container except for the communication afforded by said connection.

12. In apparatus of the character described, in combination, a container for alcohol, a chamber extending within said container and having an inlet and an outlet and containing a catalytic agent, the end of the chamber projecting from the container, a tube connecting the container with the projecting end of the chamber, and means for passing air into the container and through the apparatus.

13. In apparatus of the character described, in combination, a container for alcohol, a chamber extending within said container and having an inlet and an outlet and containing a catalytic agent, a tube connecting the container with the inlet end of the chamber, and means for forcing air through the container and the chamber under intermittent pressure.

WHARTON B. McLAUGHLIN.

Witnesses:
JOHN L. FLETCHER,
BENJ. R. JOHNSON.